United States Patent Office 3,507,797
Patented Apr. 21, 1970

3,507,797
PROCESS FOR PREPARING SOAP BARS
CONTAINING UREA
Bibhuti Ranjan Mazumder, Malabar Hill, India, assignor to Lever Brothers Company, New York, N.Y., a corporation of Maine
No Drawing. Filed Mar. 17, 1967, Ser. No. 623,836
Int. Cl. C11d 9/26, 9/30, 15/04
U.S. Cl. 252—110                                11 Claims

ABSTRACT OF THE DISCLOSURE

A toilet bar, that is prepared by a toilet bar forming process including the step of heating an aqueous solution or dispersion containing 35–60% w./w. urea, 20–50% w./w. alkali metal, ammonium or substituted ammonium soap, 7–15% w./w. saturated $C_{10}$–$C_{20}$ aliphatic monocarboxylic acid or mixture of such acids at a temperature of between 95° and 105° C. until the desired water content is reached, is described. The toilet bar optionally includes between 1 and 4% w./w. alkali metal dihydrogen phosphate and has a final pH of between 7.7 and 8.3. The bar provides a cooling sensation on the skin when used.

---

This invention relates to toilet bars that provide a cooling sensation on the skin when used.

It is well-known that urea when handled in water has a cooling effect on the skin because of its ready solubility and high endothermic heat of solution. However, the simple incorporation of urea into toilet bars whether based on soap or non-soap detergent, does not give a satisfactory product. The resulting bar tends on storage to develop slight opaque crystals on the surface or to manifest a gritty sandy feel; sometimes both defects are found together. Also, on occasion, despite the inclusion of a high proportion of urea, the cooling effect is disappointingly slight.

It has been discovered that the above defects can be reduced or removed almost altogether and bars of a satisfactory appearance can be prepared if certain critical requirements regarding the composition of the urea-based bar and its preparation are observed. These critical requirements are set out below. (All references to percentages in this specification are to percentages by weight of the bar.)

The bar contains
from 35–60% urea;
from 20–50% of an alkali-metal, ammonium or subsituted ammonium soap of the kind conventionally used in toilet bars and
from 7–15% of a saturated $C_{10}$–$C_{20}$ aliphatic monocarboxylic acid or a mixture of such acids and is prepared by a toilet bar forming process which includes the step of heating an aqueous solution or dispersion of the above components to a temperature between 95° and 105° C. until the heated mass has a water content of between 2 and 4% w./w.

The amount of urea preferably contained in the toilet bar is 45–50%, the amount of alkali metal, ammonium or substituted ammonium soap contained in the toilet bar is preferably 30–40% and the amount of saturated $C_{10}$–$C_{20}$ aliphatic monocarboxylic acid preferably contained in the toilet bar is 9–11%. It is also preferred to include in the toilet bar from 1–4%, particularly 2–3%, or an alkali-metal dihydrogen phosphate.

The term "alkali-metal" in this specification is to be taken as referring to sodium or potassium. The term "substituted ammonium soap" refers to a soap that is made with the aid of a substituted amine such as monoethanolamine, diethanolamine, triethanolamine, monopropanolamine, dipropanolamine and tripropanolamine. The term "conventionally used in toilet bars" refers to a soap made from a fat charge wherein a predominating proportion of the acid or acid residue is a saturated or unsaturated aliphatic $C_{10}$–$C_{20}$ monocarboxylic acid. The term "saturated or unsaturated aliphatic $C_{10}$–$C_{20}$ monocarboxylic acid" refers to n-undecylic acid, lauric acid, myristic acid, palmitic acid, stearic acid, arachidic acid, 10-undecylenic acid, lauroleic acid, myristoleic acid, palmetoleic acid, petroselenic acid, oleic acid, elaidic acid and linoleic acid. Particularly preferred acids include lauric acid, myristic acid, palmitic acid and stearic acid.

A minor proportion of a non-soap detergent can optionally be included. The remainder of the toiler bar consists of moisture and additives normally included in toilet bars if desired, such as perfumes, colourants, opacifying agents, fluorescers, stabilisers, anti-oxidants, germicides, skin conditioners and emollients.

A feature of the bars of the invention is their low pH in comparison with conventional toilet soap bars, namely pH 7.7–8.3.

The critical nature of the above components and limits is seen from the following Table I wherein the soap was prepared by neutralisation of fatty acid by alkali. The bars were prepared observing the critical processing requirements of the following paragraphs.

An aqueous solution or dispersion of the components that are to be used in the manufacture of the toilet bar is formed and subsequently heated at a temperature of between 95° C. and 105° C. until the water content of the heated system reaches the desired level (generally 2–4%). The mass thus obtained is cooled and any heat sensitive components (such as perfume) added. The toilet bar is formed by conventional techniques including milling, plodding and stampling of the cooled mass. The essential components of the solution or dispersion are urea, fatty acid and soap and of these the soap can either be used as such or can be formed in situ by the partial saponification of the fatty acid with an appropriate alkali. The weights of the essential components are chosen so that the final composition of the toilet bar corresponds to that defined above in this specification. To avoid decomposition of the urea during the heating stage the temperature is not allowed to rise above 105° C.; if a temperature of 95° C. is not attained a granulated product results.

An enhancement of the cooling effect can be achieved by increasing the proportion of fatty acid and decreasing the proportion of soap. A decrease in the cooling effect is achieved by increasing the proportion of soap. A decrease in the proportion of fatty acid leads to the development of a sandy feel and chalky appearance of the bar.

These facts are consistent with the theory that the basic structure of the toilet bars of the invention is a urea-fatty acid inclusion compound (formed in the heating step) stabilised by soap. According to the literature, the urea-inclusion compound should have a hexagonal structure and additional urea molecules are attached to the soap molecules by hydrogen bonding.

TABLE I

| Ref. | Urea | Stearic acid | Lauric acid | Sodium hydroxide | Potassium hydroxide | Mono sodium dihydrogen phosphate | Perfume | Cooling effect | pH | Grittiness | Keeping property |
|---|---|---|---|---|---|---|---|---|---|---|---|
| A | 46[1] | | 30 | 5 | 1 | 2.5 | .5 | Very little | 8.3 | Sandy feeling | Developed white coating during storage, no moisture absorption. |
| B | 46 | 15 | 30 | 5 | 1 | 2.5 | .5 | More cooling than A. | 7.8 | Practically absent. | No white coating but absorbed moisture. |
| C | 49 | | 40 | 6 | 2 | 2.5 | .5 | Practically no cooling. | 8.0 | do | Developed sandy granules on the surface of the bar on storage. |
| D | 61 | | 30 | 4 | 2 | 2.5 | .5 | Very slight | 8.1 | Slight sandy feeling. | Developed needle shaped crystals on the surface of the bar. |
| E | 35.5 | 22 | 32.5 | 4.5 | 2 | 2.5 | 1 | No cooling effect. | 7.7 | Practically absent. | Absorbed lot of moisture on storage. |
| F | 43 | 15 | 32.5 | 4.5 | 2 | 2.5 | .5 | Slight cooling | 7.8 | do | Absorbed lot of moisture. |
| G | 48 | 10 | 32.5 | 4.5 | 2 | 2.5 | .5 | Good | 8.0 | do | Good slight moisture absorption. |
| H | 51 | 7 | 32.5 | 4.5 | 2 | 2.5 | .5 | Not bad | 8.0 | do | Slight moisture absorption. Developed granules on storage. |
| I | 48 | 16 | 27.5 | 4 | 1.5 | 2.5 | .5 | Good | 7.8 | do | Absorbed moisture on storage. |
| J | 48 | 12.5 | 30 | 4 | 2 | 2.5 | 1 | do | 7.8 | do | Do. |
| K | 48 | 7 | 35 | 5 | 2 | 2.5 | .5 | Slight | 8.1 | Practically absent; good slip. | Developed powdery coating on the surface. |
| L | 48 | 4 | 37.5 | 6 | 1.5 | 2.5 | .5 | Very little | 8.0 | do | Developed needle shaped crystals on the surface of the bar. |

[1] This bar also contained 13 g. sodium lauryl sulphate.

It will be seen that bars outside the scope of the invention are inferior (for example, bars A, C, D, E and L) to bars within the scope of the invention (for example, bars B, F, G, H, I, J and K) and of these latter the bars of composition at the extremities of the given limits are inferior to those within the limits.

The invention is further illustrated by the following examples in which the composition and properties of toilet bars according to the invention are given. The bars were prepared observing the critical processing requirements indicated earlier.

| Ex. | Urea | Stearic acid | Lauric acid | Sodium hydroxide | Potassium hydroxide | Mono sodium dihydrogen phosphate | Perfume | Cooling effect | pH | Grittiness | Keeping property |
|---|---|---|---|---|---|---|---|---|---|---|---|
| 1 | 48 | 10 | 32.5 | 4.5 | 2 | 2.5 | .5 | Good | 8.0 | Practically absent. | Good; slight moisture absorption. |
| 2[1] | 48 | 9 | 31.25 | 4.25 | 2 | 2.5 | 1 | do | 8.1 | Practically no grittiness; good slip. | Do. |
| 3 | 49 | 9 | 32 | 4.5 | 2 | 2.5 | 1 | Moderate; almost same as Ex. 2. | 8.1 | do | Do. |
| 4 | 47 | 8 | 35 | 5 | 2 | 2.5 | .5 | do | 8.0 | Practically no grittiness; slip better than Ex. 3. | Slight moisture absorption. |
| 5[2] | 46.45 | 9.5 | 33.75 | 4.75 | 2 | 2.5 | 1 | do | 8.1 | Practically no grittiness; best slip. | Do. |

[1] Also included 2 g. beeswax.  [2] Also included 0.05 titanium dioxide.

The preparation of Example 5 was repeated using the following procedure.

Stearic acid (9.5 g.) and lauric acid (33.75 g.) were melted together in a beaker. To this was added an aqueous solution of sodium hydroxide (4.75 g.), potassium hydroxide (2.0 g.) and monosodium phosphate (2.5 g.). The mass was mixed thoroughly and dried at 95°–105° C. in an oven till the moisture content was reduced to about 3 percent. This was cooled, mixed with urea (46.45 g.) and perfume (1.0 g.), milled, plodded and stamped. On the day of stamping, the surface of the bar was quite smooth but, within two or three days, the whole bar swelled up and a thick coating of a white crystalline material covered the surface of the bar.

The above shows that heating of the mixture of fatty acid and urea is necessary for avoiding crystallisation.

What is claimed is:
1. A toilet bar containing by weight of the bar
   from 35% to 60% urea;
   from 20% to 50% of a soap selected from the group consisting of alkali metal, ammonium, monoethanolammonium, diethanolammonium, triethanolammonium, monopropanolammonium, dipropanolammonium, or tripropanolammonium soaps of fatty acids having from about 10 to about 20 carbon atoms, and mixture thereof, and
   from 7% to 15% of a saturated fatty acid selected from the group consisting of unsubstituted monocarboxylic acids having from about 10 to about 20 carbon atoms, and mixtures thereof.
   the group consisting of having from about 10 to about
2. A toilet bar according to claim 1 containing from 45–50% of urea.
3. A toilet bar according to claim 1 containing from 30–40% of the said soap.

4. A toilet bar according to claim 1 containing from 9–11% of said staturated fatty acid.

5. A toilet bar according to claim 1 in which the soap is prepared in situ by partial saponification of a fatty acid selected from the group consisting of saturated $C_{10}$–$C_{20}$ unsubstituted monocarboxylic acids and mixtures thereof.

6. A toilet bar according to claim 5 containing from 45–50% urea.

7. A toilet bar according to claim 5 containing from 30–40% soap.

8. A toilet bar according to claim 5 containing from 9–11% of said saturated fatty acid.

9. A toilet bar according to claim 1 containing from 1–4% of an alkali metal dihydrogen phosphate.

10. A toilet bar according to claim 1 containing from 2–3% of an alkali metal dihydrogen phosphate.

11. A toilet bar according to claim 1 which has a pH of 7.7–8.3.

References Cited

UNITED STATES PATENTS

| | | | |
|---|---|---|---|
| 1,716,347 | 6/1929 | Riehl et al. | 252—132 XR |
| 2,374,187 | 4/1945 | Flett | 252—152 |
| 2,665,256 | 1/1954 | Barker | 252—152 |
| 2,838,480 | 6/1958 | Swern et al. | 260—96.5 |

MAYER WEINBLATT, Primary Examiner

D. L. ALBRECHT, Assistant Examiner

U.S. Cl. X.R.

252—117, 132, 137, 152

UNITED STATES PATENT OFFICE
CERTIFICATE OF CORRECTION

Patent No. 3,507,797            Dated April 21, 1970

Inventor(s) Bibhuti Ranjan Mazumder

It is certified that error appears in the above-identified patent and that said Letters Patent are hereby corrected as shown below:

Column 2, line 43, "stamping" is misspelled.
    Table I, line 2, "grams" should read --Grams--.
    Column 4, line 66, "mixture" should read --mixtures--.
    Column 4, lines 67-71 inclusive. This entire passage should be deleted and corrected to read:
--from 7% to 15% of a saturated fatty acid selected from the group consisting of unsubstituted monocarboxylic acids having from about 10 to about 20 carbon atoms, and mixtures thereof,
which is prepared by a toilet bar forming process including the step of heating an aqueous solution or dispersion of the above components to a temperature between 95° and 105°C. until the heated mass has a water content of between 2 and 4% w/w.--

SIGNED AND SEALED
SEP 15 1970

(SEAL)
Attest:

Edward M. Fletcher, Jr.
Attesting Officer

WILLIAM E. SCHUYLER, JR.
Commissioner of Patents